United States Patent
Jen et al.

(10) Patent No.: US 7,268,188 B2
(45) Date of Patent: Sep. 11, 2007

(54) REVERSIBLE CROSSLINKING METHOD FOR MAKING AN ELECTRO-OPTIC POLYMER

(75) Inventors: Kwan-Yue Jen, Kenmore, WA (US); Larry R. Dalton, Silverdale, WA (US); Jingdong Luo, Seattle, WA (US); Marnie A. Haller, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 11/566,617

(22) Filed: Dec. 4, 2006

(65) Prior Publication Data

US 2007/0112140 A1 May 17, 2007

Related U.S. Application Data

(62) Division of application No. 10/758,292, filed on Jan. 15, 2004, now Pat. No. 7,144,960.

(60) Provisional application No. 60/440,971, filed on Jan. 15, 2003.

(51) Int. Cl.
*C08F 259/00* (2006.01)
(52) U.S. Cl. .................. 525/276; 525/282; 526/242; 526/245; 526/246; 526/262
(58) Field of Classification Search ................ 525/276, 525/282; 526/242, 245, 246, 262
See application file for complete search history.

(56) References Cited

U.S. PATENT DOCUMENTS 5,447,662 A 9/1995 Herr et al.
5,489,451 A 2/1996 Omeis et al.

OTHER PUBLICATIONS

Chen, X., et al., "A Thermally Re-Mendable Cross-Linked Polymeric Material," *Science* 295:1698-1702, Mar. 1, 2002.

Goussé, C., et al., "Application of the Diels-Alder Reaction to Polymers Bearing Furan Moieties. 2. Diels-Alder and Retro-Diels-Alder Reactions Involving Furan Rings in Some Stryrene Copolymers," *Macromolecules* 31:314-421, 1998.

Kwart, H., and K. King, "The Reverse Diels-Alder or Retrodiene Reaction," *Chemical Reviews* 68(4):415-447, Aug. 1968.

Lui, J., et al., "Design, Synthesis, and Properties of Highly Efficient Side-Chain Dendronized Nonlinear Optical Polymers for Electro-Optics," *Advanced Materials* 14(23):1763-1768, Dec. 3, 2002.

Luo, J., et al., "Design, Synthesis, and Properties of Highly Efficient Side-Chain Dendronized Nonlinear Optical Polymers for Electro-Optics," *Advanced Materials* 14(23):1763-1768, Dec. 3, 2002.

Ma, H., et al., "Polymer-Based Optical Waveguides: Materials, Processing, and Devices," *Advanced Materials* 14 (19):1339-1365, Oct. 2, 2002.

McElhanon, J.R., and D.R. Wheeler, "Thermally Responsive Dendrons and Dendrimers Based on Reversible Furan-Maleimide Diels-Alder Adducts," *Organic Letters* 3(17):2681-2683, 2001.

Yoon, S.S., and W.C. Still, "Sequence-Selective Peptide Binding With a Synthetic Reception," *Tetrahedron* 51(2):567-578, 1995.

*Primary Examiner*—Bernard Lipman
(74) *Attorney, Agent, or Firm*—Christensen O'Connor Johnson Kindness PLLC (57) ABSTRACT

A crosslinkable second-order nonlinear optical polymer having one or more polarizable chromophore moieties, one or more diene moieties, and one or more dienophile or dienophile precursor moieties, wherein the diene and dienophile moieties are reactive to form 4+2 cycloaddition products; a crosslinked second-order nonlinear optical polymer having aligned, polarizable chromophore moieties and one or more 4+2 cycloaddition moieties, wherein the 4+2 cycloaddition moieties are reversibly, thermally reactive to provide diene moieties and dienophile moieties; lattices and devices that include the crosslinkable second-order nonlinear optical polymer; lattices and devices that include the crosslinked second-order nonlinear optical polymer; and methods for making the crosslinked second-order nonlinear optical polymer.

11 Claims, 4 Drawing Sheets

REVERSIBLE CROSSLINKING METHOD FOR MAKING AN ELECTRO-OPTIC POLYMER

CROSS-REFERENCE TO RELATED APPLICATION

This application is a divisional of U.S. patent application Ser. No. 10/758,292, filed Jan. 15, 2004, now U.S. Pat. No. 7,144,960, which claims the benefit of U.S. Provisional Application No. 60/440,971, filed Jan. 15, 2003. Each application is expressly incorporated herein by reference in its entirety.

GOVERNMENT RIGHTS

This invention was made with government support awarded by the Air Force Office of Scientific Research (Government Contract No. F49620-01-0364). The government has certain rights in the invention.

FIELD OF THE INVENTION

The present invention relates to a nonlinear optical polymer useful in electro-optic devices and a method for making the polymer.

BACKGROUND OF THE INVENTION

Organic second-order nonlinear optical (NLO) polymers have received increasing interests due to their potential for applications in high-speed electro-optic (E-O) devices with very broad bandwidth and low drive voltage, and that can be made with cost effective fabrication process. In order to be qualified for practical devices, a material needs to possess simultaneously large and thermally stable E-O activity, and good processibility. Although some of the above-mentioned requirements have been satisfied individually, the success of integrating all these desirable properties in a single material system has not yet been realized and remains a very challenging task. For example, large E-O coefficients have been demonstrated in several guest/host poled polymers, but these materials often suffer from low poling-induced alignment stability and poor solvent resistance during the multi-layer fabrication process. Thus, it is desirable to be able to covalently incorporate chromophores into a polymer network and harden the matrix through crosslinking reactions to improve both thermal and mechanical properties. However, a reduction of 20-40% in E-O activity is usually accompanied with this approach. E-O activity is reduced because typical poling of conventional NLO thermoset polymers is achieved through a sequential lattice hardening and poling process. As a result, the lattice hardening significantly reduces the chromophore orientational flexibility due to the increase of glass-transition temperature ($T_g$) and interchain entanglements of the polymers, which severely inhibit chromophore reorientation under the poling field, resulting in a decreased poling efficiency. In addition, high temperatures needed for curing these polymers often cause decomposition of highly polarizable chromophores.

To overcome this nonlinearity-stability problem, the lattice hardening process should be ideally separated from the poling process that requires high rotation freedom of chromophores. In addition, because most of the highly efficient NLO chromophores possess only moderate chemical and thermal stability, very mild conditions should be employed for lattice hardening.

Accordingly, a need exists for a method for making an NLO polymer that allows for high rotation freedom of NLO chromophores during the poling process and relatively mild conditions for lattice hardening. The present invention seeks to fulfill this need and provides further related advantages.

SUMMARY OF THE INVENTION

In one aspect of the present invention, second-order nonlinear optical polymers are provided. In one embodiment, the nonlinear optical polymers are crosslinkable. The crosslinkable polymers include a chromophore moiety and a diene and dienophile having reactivity sufficient to provide a 4+2 cycloaddition product. In another embodiment, the nonlinear optical polymers are crosslinked. The crosslinked polymers include a 4+2 cycloaddition product formed by reaction of a diene and dienophile.

In another aspect, the present invention provides a method for making second-order nonlinear optical polymers. In one embodiment of the method the steps include poling a crosslinkable polymer having one or more polarizable chromophore moieties, and one or more diene moieties and one or more dienophile moieties in an electric field to provide a poled crosslinkable polymer having aligned, polarizable chromophore moieties; and crosslinking the poled crosslinkable polymer having aligned, polarizable chromophore moieties to provide a crosslinked polymer having aligned, polarizable chromophore moieties. The polymer crosslinks include 4+2 cycloaddition moieties formed by reaction of diene and dienophile moieties.

In other aspects of the invention, lattices that include the nonlinear optical polymers and devices that include the nonlinear optical polymers are provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In one aspect, the present invention provides second-order nonlinear optical polymers that are useful in electro-optic devices.

In one embodiment, the nonlinear optical polymers are crosslinkable. The crosslinkable polymers include one or more polarizable chromophore moieties, one or more diene moieties, and one or more dienophile or dienophile precursor moieties. The diene and dienophile moieties are reactive to form 4+2 cycloaddition products. In one embodiment, the dienophile moiety is a maleimide moiety. In one embodiment, the diene moiety is a furan moiety. In one embodiment, the chromophore moiety comprises one or more crosslinkable moieties, such as trifluorovinyl ether moieties.

In another embodiment, the nonlinear optical polymers are crosslinked. The crosslinked polymers include aligned, polarizable chromophore moieties, and one or more 4+2 cycloaddition moieties formed by reaction of a diene and dienophile. The 4+2 cycloaddition moieties are reversibly, thermally reactive to provide diene moieties and dienophile moieties. This feature allows for improved chromophore alignment during the poling process.

The crosslinked polymers of the invention are provided by the Diels-Alder [4+2] cycloaddition reaction, which can be carried out during lattice hardening. The Diels-Alder (DA) reaction involves covalent coupling of a "diene" with a "dienophile" to provide a cyclohexene cycloadduct. See, for example, Kwart, H., and K. King, Chem. Rev. 68:415, 1968Most DA cycloadditions can be described by a symmetry-allowed concerted mechanism without generating the biradical or zwitterion intermediates. Among many features of the DA reaction is that the resultant adducts can be reversibly thermally cleaved to regenerate the starting materials (i.e., diene and dienophile). For example, the retro-DA reaction has been exploited to thermally crosslink linear polymers that are capable of reverting to their thermoplastic precursors by heating. See, for example, (a) Chen, X., et al., Science 295:1698, 2002; (b) Gousse, C., et al., Macromolecules 31:314, 1998; (c) McElhanon, J. R., and D. R. Wheeler, Org. Lett. 3:2681, 2001The crosslinked polymers of the invention are prepared by a method that utilizes process advantages in hardening NLO polymers to achieve a polymer having both high nonlinearity and thermal stability.

As used herein, the term "diene" refers to a 1,3-diene that is reactive toward a dienophile to provide a 4+2 (Diels-Alder) cycloaddition product (i.e., a cyclohexene). The term "dienophile" refers to an alkene that is reactive toward a diene to provide a 4+2 cycloaddition product. The term "dienophile precursor" refers to a moiety that can be converted to a dienophile. Suitable dienes and dienophiles may be unsubstituted or substituted.

The crosslinkable and crosslinked polymers of the invention can be thermoplastic polymers. In one embodiment, the crosslinkable polymers are thermoplastic polymers. In one embodiment, the crosslinked polymers are thermoplastic polymers. As used herein, the term "thermoplastic" refers to a polymer or material having the property of softening when heated and of hardening and becoming rigid again when cooled. Typically, thermoplastic materials can be remelted and cooled time after time without undergoing any appreciable chemical change.

As noted above, the crosslinkable polymer includes one or more polarizable chromophore moieties, one or more diene moieties, and one or more dienophile or dienophile precursor moieties. The polymer may be any one of a variety of polymers that includes the chromophore, diene, and dienophile (or dienophile precursor) moieties. Suitable polymers include homopolymers, copolymers, block copolymers, and grafted polymers. In one embodiment, the polymer is a homopolymer to which have been grafted the chromophore, diene, and dienophile (or dienophile precursor) moieties. In this embodiment, the polymer (e.g., poly (4-vinylphenol)) has a functional group (e.g., phenolic hydroxyl) that is suitable for reaction with suitably functionalized chromophore, diene, and dienophile (or dienophile precursor) compound (e.g., carboxyl group) to covalently couple the chromophore, diene, and dienophile (or dienophile precursor) moieties to the polymer backbone (e.g., through an ester link).

The polymers may be prepared through grafting, for example, by covalently coupling a chromophore moiety, a diene moiety, and a dienophile (or dienophile precursor) moiety to a polymer backbone, where a suitable functional group (e.g., carboxyl group) on the chromophore moiety, diene moiety, and dienophile (or dienophile precursor) moiety reacts with a suitable functional group on the polymer (e.g., phenolic hydroxyl group). Alternatively, the polymer may be prepared by reacting a chromophore containing a polymerizable group, a diene (or diene precursor) containing a polymerizable group, and a dienophile (or dienophile precursor) containing a polymerizable group to form a polymer. Combinations of polymerizing and grafting may also be used.

The polymers of the invention include one or more second-order nonlinear optical chromophore moieties. As used herein, the term "chromophore" refers to a moiety that can absorb a photon of light. Thus, by virtue of the presence of one or more chromophore moieties, the polymers of the invention are chromophores. In the context of the polymers of the invention, the term "nonlinear" refers second order effects that arise from the nature of the polarizable chromophore moieties (i.e., "push-pull" chromophore moieties) having the general structure D-$\pi$-A, where D is an electron donor, A is an electron acceptor, and $\pi$ is a $\pi$-bridge that conjugates the donor to the acceptor.

A "donor" (represented by "D") is an atom or group of atoms with low electron affinity relative to an acceptor (defined below) such that, when the donor is conjugated to an acceptor through a $\pi$-bridge, electron density is transferred from the donor to the acceptor.

An "acceptor" (represented by "A") is an atom or group of atoms with high electron affinity relative to a donor such that, when the acceptor is conjugated to a donor through a $\pi$-bridge, electron density is transferred from the acceptor to the donor.

A "$\pi$-bridge" or "conjugated bridge" (represented in chemical structures by "$\pi$" or "$\pi^n$" where n is an integer) is comprised of an atom or group of atoms through which electrons can be delocalized from an electron donor (defined above) to an electron acceptor (defined above) through the orbitals of atoms in the bridge. Preferably, the orbitals will be p-orbitals on multiply bonded carbon atoms such as those found in alkenes, alkynes, neutral or charged aromatic rings, and neutral or charged heteroaromatic ring systems. Additionally, the orbitals can be p-orbitals on multiply bonded atoms such as boron or nitrogen or organometallic orbitals. The atoms of the bridge that contain the orbitals through which the electrons are delocalized are referred to here as the "critical atoms." The number of critical atoms in a bridge can be a number from 1 to about 30. The critical atoms can also be substituted further with the following: "alkyl" as defined below, "aryl" as defined below, or "heteroalkyl" as defined below. One or more atoms, with the exception of hydrogen, on alkyl, aryl, or heteroalkyl substituents of critical atoms in the bridge may be bonded to atoms in other alkyl, aryl, or heteroalkyl substituents to form one or more rings.

Representative chromophores, donors, acceptors, and i-bridges known to those skilled in the art and useful in making the polymers of the invention are described in U.S. Pat. Nos. 6,361,717; 6,348,992; 6,090,332; 6,067,186; 5,708,178; and 5,290,630; each expressly incorporated herein by reference in its entirety. Representative chromophores that can be suitably functionalized for coupling to a polymer for making the polymers of the invention are described in WO 02/08215; U.S. patent application Ser. No. 10/212,473, filed Aug. 2, 2002; U.S. patent application Ser. No. 10/347,117, filed Jan. 15, 2003; and U.S. Provisional Patent Application No. 60/520,802, filed Nov. 17, 2003; *Adv. Mater.* 14(23):1763-1768, 2002; and *Adv. Mater.* 14(19):1339-1365, 2002; each expressly incorporated herein by reference in its entirety.

The polymers of the invention include one or more diene moieties. Suitable diene moieties include any diene (i.e., 1,3-diene) moiety that is reactive in forming a 4+2 cycloaddition product with a dienophile. As noted above, the diene is covalently coupled to the polymer backbone to provide the polymers of the invention by the reaction of a suitable functional group on the diene (e.g., carboxyl group) with a suitable functional group on the polymer (i.e., phenolic hydroxyl group). In one embodiment, the diene moiety includes a furan moiety.

The polymers of the invention include one or more dienophile or dienophile precursor moieties. Suitable dienophile moieties include any dienophile moiety that is reactive in forming a 4+2 cycloaddition product with a diene. Suitable dienophile precursor moieties include any dienophile precursor moiety that provides a dienophile that is reactive in forming a 4+2 cycloaddition product with a diene. In one embodiment, the dienophile moiety includes a maleimide moiety. In one embodiment, the dienophile precursor moiety includes a capped maleimide moiety (e.g., furan-capped maleimide).

Figure 1:
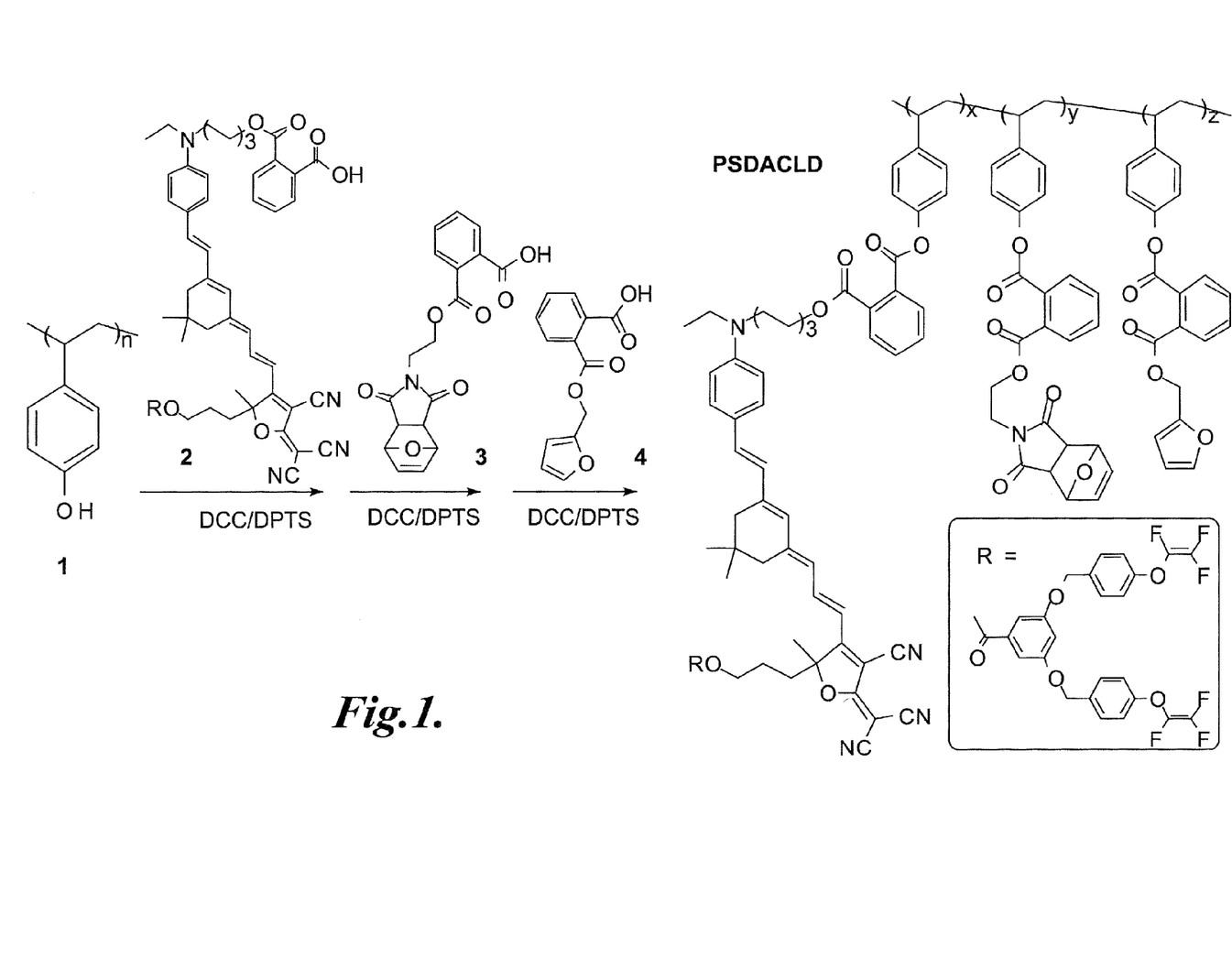
FIG. 1 is a schematic illustration of the preparation of a representative crosslinkable polymer of the invention (PS-DACLD) having a second-order nonlinear optical chromophore (CLD) moiety, a dienophile (masked maleimide) moiety, and a diene (furan) moiety.

The synthesis of a representative crosslinkable polymer of the invention is described in the Example and is illustrated schematically in FIG. 1. FIG. 1 illustrates the preparation of a PSDACLD, a poly(4-vinylphenol)-based polymer that includes a second-order nonlinear optical chromophore (i.e., CLD) moiety, a dienophile (i.e., masked maleimide) moiety, and a diene (i.e., furan) moiety. Although a representative polymer is described as having these specific components, it will be appreciated that the polymers of the invention can include a variety of chromophore, dienophiles, and dienes. FIG. 1 also depicts poly(4-vinylphenol) as having n repeating units and the product polymer having x units that include the chromophore moiety, y units that include the dienophile (or dienophile precursor moiety), and z units that include the diene moiety. It will be appreciated that FIG. 1 is a schematic representation of a polymer of the invention and that the polymer may comprise repeating units that do not include chromophore, diene, or dienophile moieties. It will also be appreciated that the chromophore, diene, and dienophile moieties do not necessarily occur in blocks in the polymer as depicted in FIG. 1.

As depicted schematically in FIG. 1, the crosslinkable polymers of the invention include three different functional moieties: (1) chromophore moieties, such as derivatives of CLD-type chromophore, (2) dienophile moieties, such as capped maleimide, and (3) diene moieties, such as furan. The functional moieties are covalently attached to a polymer backbone (e.g., poly(4-vinylphenol)) as side chains to afford crosslinkable NLO polymer PSDACLD.

In this synthesis, the maleimide (dienophile) is protected with furan to prevent any crosslinking reaction from occurring prior to the lattice hardening step. The resultant PSDACLD possesses good solubility in common organic solvents, such as chloroform and THF. The polymer was characterized by $^1$H NMR, $^{19}$F NMR, UV-Vis spectroscopy, GPC, and thermal analysis, as described in the Example. The chromophore loading level in PSDACLD was at about 15 weight percent, confirmed by the relative integration comparison of those characteristic peaks in $^1$H NMR spectrum.

Figure 2A:
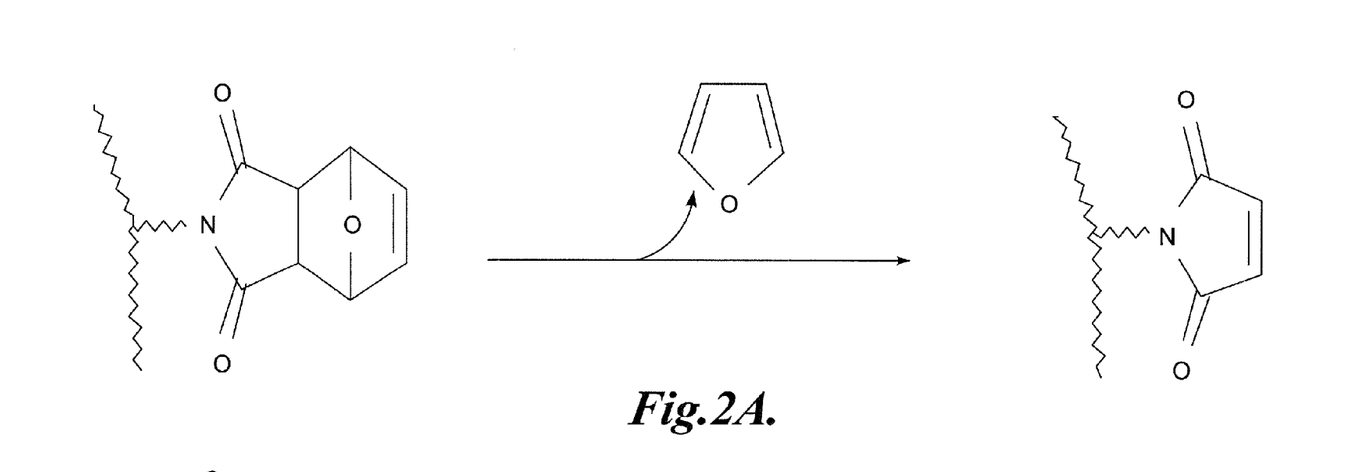
FIG. 2A is a schematic illustration of the irreversible deprotection of a representative masked dienophile moiety to provide a dienophile (maleimide) moiety useful in the method of the invention.

The furan used for protecting the maleimide moiety can be thermally cleaved by retro-DA reaction and easily evaporated from polymer to provide the maleimide moiety as dienophile. FIG. 2A is a schematic illustration of the irreversible deprotection of a representative masked dienophile moiety to provide a dienophile (maleimide) moiety useful in the method of the invention.

Figure 3:
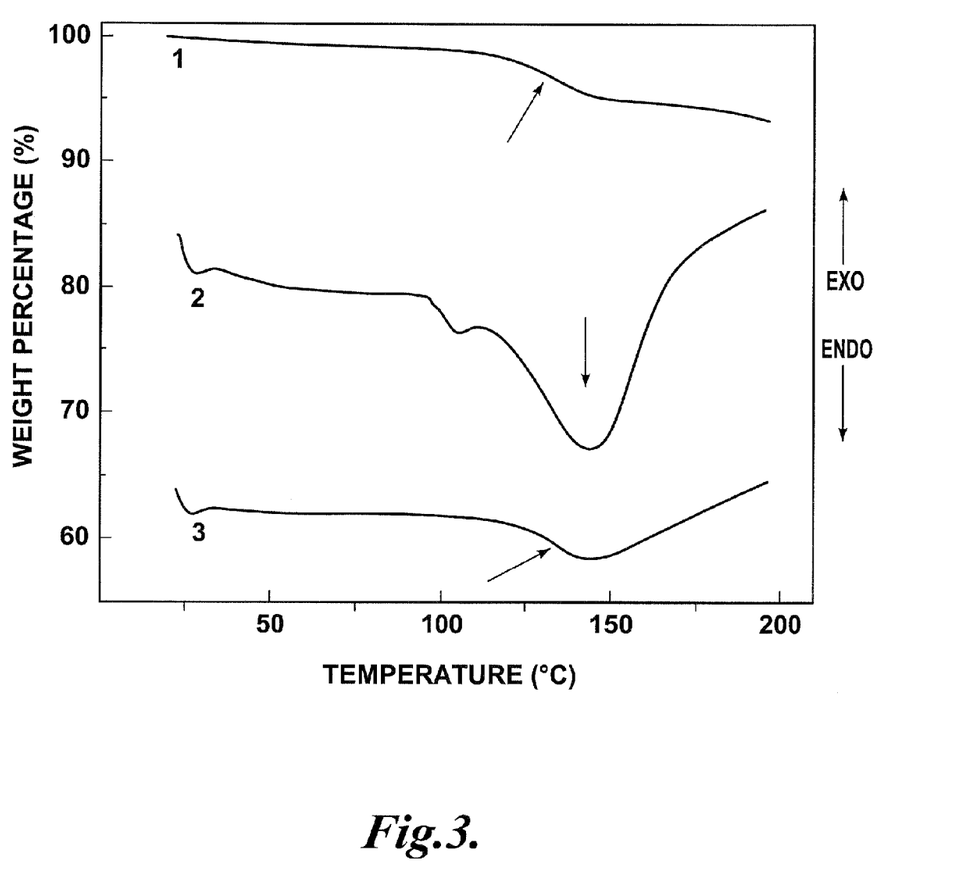
FIG. 3 is a graph illustrating the thermal analysis (10° C./min) of a representative nonlinear optical polymer of the invention (PSDACLD); plots 1 (TGA) and 2 (DSC) correspond to polymer samples that were heated from room temperature to 200° C.; plot 3 (DSC) corresponds to a polymer sample that was heated from room temperature to 200° C. after heating at 125° C. for 30 minutes.

The loss of furan and the formation of the maleimide moiety as dienophile can be clearly verified by thermal analysis. FIG. 3 is a graph illustrating the thermal analysis PSDACLD. The thermal gravimetric analysis (TGA) (Plot 1) shows a steep weight loss of 4.5 weight percent from 10° C. to 150° C., corresponding to an endothermic peak observed in similar temperature range by thermal analysis using differential scanning calorimeter (DSC) (Plot 2). Isothermal heating of the sample at 125° C. for 30 minutes also resumed the weight loss of 4.5 weight percent, a value that is in good agreement with the content of furan used for protection. After this, the sample became completely insoluble even after it was rapidly quenched to room temperature, indicating the ease of DA crosslinking reaction between the side chains of imido and furan moieties.

However, this crosslinked network can be dissociated thermally, evidenced by the reappearance of the similar endothermic peak of retro-DA reaction when the thermally quenched sample was re-heated again by DSC. See FIG. 3, Plot 3. The study from DSC also shows a typical glass-transition behavior around 100° C. for PSDACLD.

Figure 2B:
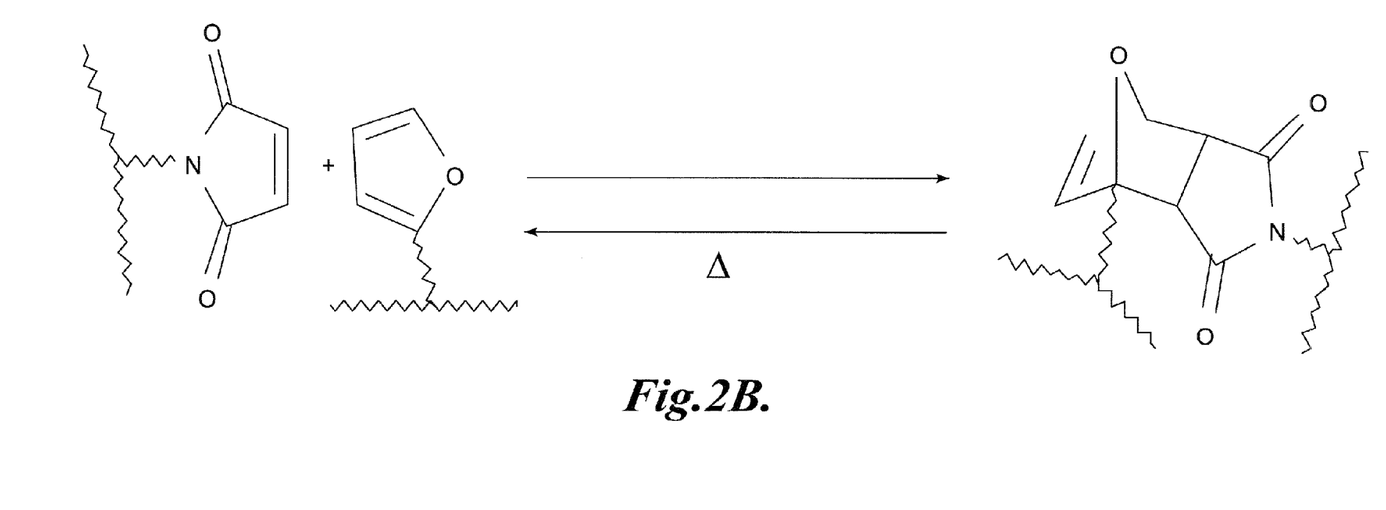
FIG. 2B is a schematic illustration of the thermally reversible crosslinking of a representative dienophile (maleimide) moiety and a representative diene (furan) moiety to provide a representative 4+2 cycloaddition product useful in making a representative crosslinked nonlinear optical polymer of the invention.

FIG. 2B is a schematic illustration of the thermally reversible crosslinking of a representative dienophile (maleimide) moiety and a representative diene (furan) moiety to provide a representative 4+2 cycloaddition product useful in making a representative crosslinked nonlinear optical polymer of the invention.

In order to improve the poling efficiency, PSDACLD is also covalently attached with a fluorinated dendron, which has previously been employed to demonstrate the advantage of the site-isolation effect in side-chain dendronized NLO polymers. See Luo, J. D., et al., *Advanced Materials*, 14:1763, 2002 The highest temperature used in the poling process described above is only about 125° C. Under such conditions, the trifluorovinyl ether functional groups are not reactive: these groups do not polymerize (no polymerization below 160° C.) and do not interfere with the DA crosslinking reaction by acting as a dienophile. No cycloaddition products were formed between 4-(trifluorovinyloxy)bromobenzene and furan even after refluxing overnight in methanol. The fluorinated dendrons in PSDACLD can be used to mimic the local environment around the chromophore as for side-chain dendronized NLO polymers and to provide a parallel comparison of the poling efficiency. See FIG. 1, where the chromophore moiety includes an acceptor moiety substituted with R, a trifluorovinyl ether dendron.

For E-O measurements, a filtered solution (filtered through the 0.2 μm PTFE filter) of PSDACLD in cyclopentanone was spin-coated onto indium tin oxide (ITO) glass substrates. The films were baked under vacuum at 85° C. overnight to ensure removal of the residual solvent, and then baked under nitrogen at 125° C. for 30 minutes to evaporate the furan protecting group. A thin layer of gold was then sputtered onto the films as the top electrode for performing the poling experiments. Because the polymer has been crosslinked upon cooling, the films were again baked at 120° C. for 1 hour to revert to its linear thermoplastic polymer precursor. This is one of many advantages of this approach: retro-DA reaction allows the technique of contact poling even after small molecules like furan are evaporated prior to poling. The film was then cooled down to 100° C. and poled at this temperature with a DC electric field of 1.42 MV/cm. This poling temperature is close to the onset temperature of the retro-DA reaction (110° C.) and slightly higher than the typical temperature range used for DA crosslinking reaction (65 to 85° C.). At this temperature, the material possesses the characteristics of a typical thermoplastic polymer. Concurrently, the chromophores can be effectively reoriented under the poling field. After the poling process, a sequential cooling/curing process (85° C. for 1 hour, 75° C. for 1 hour, and 65° C. for 1 hour) was performed to anneal and crosslink the polymer through the DA reaction. All of the above conditions are very mild and can be tolerated by the chemically and thermally sensitive CLD-type NLO chromophores in PSDACLD, which was previously precluded by several conventional thermoset polymer systems due to the harsh and reactive conditions. The electro-optic (E-O) coefficient ($r_{33}$) value was measured using the reflection technique at 1.3 μm, and the poled film after lattice hardening of PSDACLD showed a very large E-O coefficient ($r_{33}$=76 pm/V).

Considering the chromophore content is only 15 weight percent in PSDACLD, this value proves that the same high poling efficiency can be reproduced as the side-chain dendronized NLO polymer (97 pm/V and 20 weight percent, chromophore content). See Luo, J. D., et al., *Advanced Materials*, 14:1763, 2002 More importantly, the lattice hardening for PSDACLD is separated from its poling process: the poled films can be effectively hardened at temperatures far below the poling temperature. As a result, the orientation order of chromophores can be maintained very well during the crosslinking process, leading to a high E-O activity even after the lattice hardening. For comparison, the E-O coefficient of a conventional polyurethane thermoset with a similar chromophore has been found to possess a much lower $r_{33}$ value than that obtained from the guest-host materials (36 vs. 57 pm/V at 1.06 μm). See Van der Boom, M. E., et al., *Langmuir* 18:3704, 2002.

Due to the efficient lattice hardening of DA reaction, the material also exhibited very promising temporal alignment stability: the poled films of PSDACLD retains about 80% of its original $r_{33}$ value after baking at 70° C. for several hundred hours.

Figure 4A:
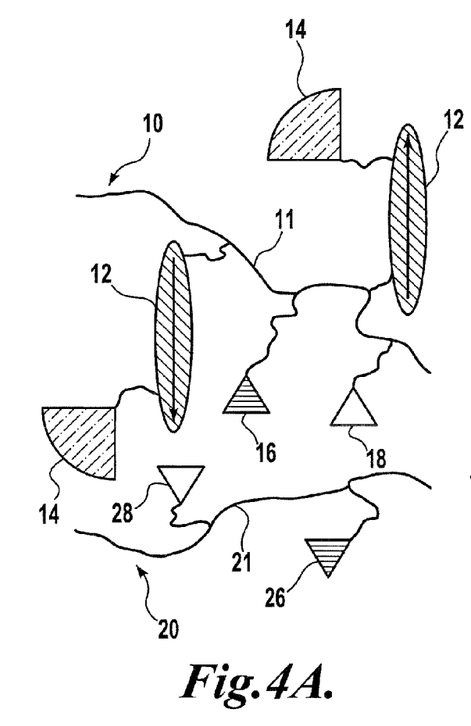
FIG. 4A is a schematic illustration of a representative crosslinkable polymer of the invention having non-aligned chromophore moieties before electric field poling.
Figure 4B:
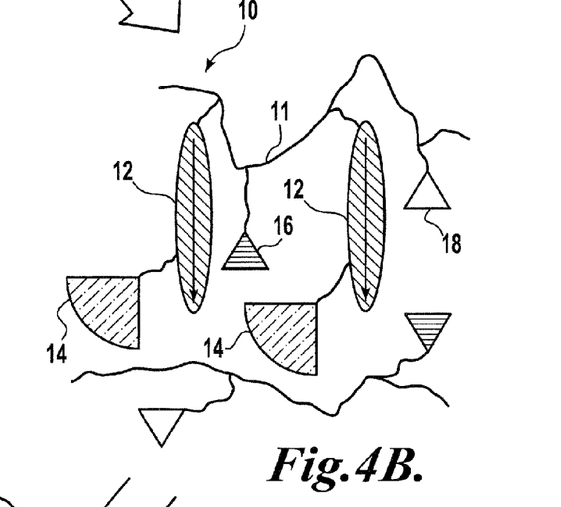
FIG. 4B is a schematic illustration of a representative crosslinkable polymer of the invention having aligned chromophore moieties after electric field poling.
Figure 4C:
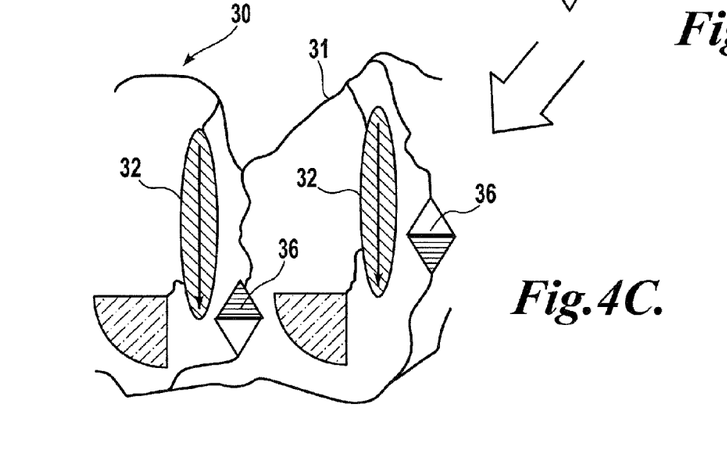
FIG. 4C is a schematic illustration of a representative crosslinked polymer of the invention having aligned chromophore moieties after lattice hardening through 4+2 cycloaddition of diene and dienophile moieties.

A representative crosslinked polymer of the invention is illustrated schematically in FIG. 4C. The crosslinked polymer includes the chromophore moieties as described above for the crosslinkable polymer. In the crosslinked polymer, at least some of the diene and dienophile groups present in the crosslinkable polymer have been reacted to provide 4+2 cycloaddition products. Referring to FIG. 4C, crosslinked polymer 30 includes aligned, polarizable chromophore moieties 32 (arrows depict chromophore dipole alignment), with optional dendrons 34, grafted to polymer backbone 31, which is crosslinked through 4+2 cycloaddition moieties 36.

In another aspect, the present invention provides a method for making a crosslinked polymer having electro-optic activity. Generally, a crosslinkable polymer of the invention is heated to provide a softened polymer, which is poled to align its chromophore moieties, and then hardened (i.e., crosslinked) by cooling to provide a crosslinked polymer having aligned chromophore moieties. As used herein, the term "softened" refers to a polymer or material of the invention in which its chromophore moieties are sufficiently mobile to align in an electric field. The term "hardened" refers to a polymer or material of the invention in which its chromophore moieties are restricted in mobility and cannot readily align or depole.

In one embodiment, the method includes the steps of heating a crosslinkable polymer of the invention to form a softened polymer; subjecting the softened polymer to an electric field to provide a poled polymer having aligned, polarizable chromophore moieties; and cooling the poled polymer to a temperature sufficient to provide a hardened, crosslinked polymer having electro-optic activity.

In this embodiment of the method, a crosslinkable polymer having one or more polarizable chromophore moieties, and one or more diene moieties and one or more dienophile moieties is poled in an electric field to provide a poled crosslinkable polymer having aligned, polarizable chromophore moieties. The poled crosslinkable polymer having aligned, polarizable chromophore moieties is then crosslinked to provide a crosslinked polymer having aligned, polarizable chromophore moieties. The polymer crosslinks include 4+2 cycloaddition moieties formed by reaction of diene and dienophile moieties.

A representative method for making the crosslinked polymer of the invention is illustrated schematically in FIGS. 4A-4C. FIG. 4A shows a representative crosslinkable polymer of the invention having non-aligned chromophore moieties before electric field poling. The crosslinkable polymer 10 includes polarizable chromophore moieties 12 (arrows depict chromophore dipole alignment) with optional dendrons 14, dienophile moieties 16, and diene moieties 18 grafted to polymer backbone 11. Crosslinkable polymer 20, which may be a separate polymer that may include chromophore moieties or another portion of crosslinkable polymer 10, also includes dienophile moieties 26 and diene moieties 28. FIG. 4B schematically illustrates crosslinkable polymer 10 after electric field poling (e.g., at about 100° C.). Referring to FIG. 4B, crosslinkable polymer 10 includes aligned, polarizable chromophore moieties 12 (arrows depict chromophore dipole alignment) with optional dendrons 14, dienophile moieties 16, and diene moieties 18. FIG. 4C schematically illustrates a representative crosslinked polymer of the invention having aligned chromophore moieties after lattice hardening (65-85° C.) through 4+2 cycloaddition of diene and dienophile moieties on neighboring polymers (or the same polymer at remote sites). Referring to FIG. 4C, crosslinked polymer 30 includes aligned, polarizable chromophore moieties 32 (arrows depict chromophore dipole alignment) with optional dendrons 34, grafted to polymer backbone 31, which is crosslinked through 4+2 cycloaddition moieties 36.

In one embodiment, the method further includes the steps of heating the hardened, crosslinked polymer at a temperature sufficient to provide a softened, crosslinkable polymer; subjecting the softened, crosslinkable polymer to an electric field to provide a poled crosslinkable polymer; and cooling the poled crosslinkable polymer to a temperature sufficient to provide a hardened, crosslinked polymer having electro-optic activity.

In this embodiment, the initially formed crosslinked polymer is heated at a temperature sufficient to cause one or more of the 4+2 cycloaddition moieties to react (retro-DA) to form one or more diene moieties and one or more dienophile moieties to provide a crosslinkable polymer. The crosslinkable polymer is then poled to provide a poled polymer having an increased number of aligned chromophore moieties. The poled polymer having an increased number of aligned chromophore moieties is then crosslinked to provide a second crosslinked, poled polymer having increased aligned chromophore moieties compared to the initially formed crosslinked polymer. These steps may be repeated to further enhance chromophore alignment.

In other aspects of the invention, materials (e.g., lattices) that include the nonlinear optical polymers and devices that include the nonlinear optical polymers are provided.

The materials and methods described herein can be useful in a variety of electro-optic applications. In addition, these materials and methods may be applied to polymer transistors or other active or passive electronic devices, as well as OLED (organic light emitting diode) or LCD (liquid crystal display) applications.

The use of organic polymers in integrated optics and optical communication systems containing optical fibers and routers has been previously described. The compounds, molecular components, polymers, and compositions (hereinafter, "materials") may be used in place of currently used materials, such as lithium niobate, in most type of integrated optics devices, optical computing applications, and optical communication systems. For instance, the materials may be fabricated into switches, modulators, waveguides, or other electro-optical devices.

For example, in optical communication systems devices fabricated from the polymers of the invention may be incorporated into routers for optical communication systems or waveguides for optical communication systems or for optical switching or computing applications. Because the materials are generally less demanding than currently used materials, devices made from such polymers may be more highly integrated, as described in U.S. Pat. No. 6,049,641, which is incorporated herein by reference. Additionally, such materials may be used in periodically poled applications as well as certain displays, as described in U.S. Pat. No. 5,911,018, which is incorporated herein by reference.

Techniques to prepare components of optical communication systems from optically transmissive materials have been previously described, and may be utilized to prepare such components from materials provided by the present invention. Many articles and patents describe suitable techniques, and reference other articles and patents that describe suitable techniques, where the following articles and patents are exemplary:

Eldada, L. and L. Shacklette, "Advances in Polymer Integrated Optics," *IEEE Journal of Selected Topics in Quantum Electronics* 6(1):54-68, January/February 2000; Wooten, E. L., et al. "A Review of Lithium Niobate Modulators for Fiber-Optic Communication Systems," *IEEE Journal of Selected Topics in Quantum Electronics* 6 (1): 69-82, January/February 2000; Heismann, F., et al. "Lithium Niobate Integrated Optics: Selected Contemporary Devices and System Applications," *Optical Fiber Telecommunications*III B, Academic, Kaminow and Koch (eds.), New York, 1997, pp. 377-462; Murphy, E., "Photonic Switching," *Optical Fiber Telecommunications*III B, Academic, Kaminow and Koch (eds.), New York, 1997, pp. 463-501; E. Murphy, *Integrated Optical Circuits and Components: Design and Applications.*, Marcel Dekker, New York, August 1999; Dalton, L., et al., "Polymeric Electro-Optic Modulators: From Chromophore Design to Integration with Semiconductor Very Large Scale Integration Electronics and Silica Fiber Optics," *Ind. Eng. Chem. Res*. 38:8-33, 1999; Dalton, L., et al., "From Molecules to Opto-Chips: Organic Electro-Optic Materials," *J. Mater. Chem*. 9:1905-1920, 1999; Liakatas, I. et al., "Importance of Intermolecular Interactions in the Nonlinear Optical Properties of Poled Polymers," *Applied Physics Letters* 76(11): 1368-1370, Mar. 13, 2000; Cai. C., et al., "Donor-Acceptor-Substituted Phenylethenyl Bithiophenes: Highly Efficient and Stable Nonlinear Optical Chromophores," *Organic Letters* 1(11):1847-1849, 1999; Razna, J., et al., "NLO Properties of Polymeric Langmuir-Blodgett Films of Sulfonamide-Substituted Azobenzenes," *J. of Materials Chemistry* 9:1693-1698, 1999; Van den Broeck, K., et al., "Synthesis and Nonlinear Optical Properties of High Glass Transition Polyimides," *Macromol. Chem. Phys* 200:2629-2635, 1999; Jiang, H., and A. K. Kakkar, "Functionalized Siloxane-Linked Polymers for Second-Order Nonlinear Optics," *Macromolecules* 31:2508, 1998; Jen, A. K.-Y. , "High-Performance Polyquinolines with Pendent High-Temperature Chromophores for Second-Order Nonlinear Optics," *Chem. Mater*. 10:471-473, 1998; "Nonlinear Optics of Organic Molecules and Polymers," Hari Singh Nalwa and Seizo Miyata (eds.), CRC Press, 1997; Cheng Zhang, Ph.D. Dissertation, University of Southern California, 1999; Galina Todorova, Ph.D. Dissertation, University of Southern California, 2000; U.S. Pat. Nos. 5,272,218; 5,276,745; 5,286,872; 5,288,816; 5,290,485; 5,290,630; 5,290,824; 5,291,574; 5,298,588; 5,310,918; 5,312,565; 5,322,986; 5,326,661; 5,334,333; 5,338,481; 5,352,566; 5,354,511; 5,359,072; 5,360,582; 5,371,173; 5,371,817; 5,374,734; 5,381,507; 5,383,050; 5,384,378; 5,384,883; 5,387,629; 5,395,556; 5,397,508; 5,397,642; 5,399,664; 5,403,936; 5,405,926; 5,406,406; 5,408,009; 5,410,630; 5,414,791; 5,418,871; 5,420,172; 5,443,895; 5,434,699; 5,442,089; 5,443,758; 5,445,854; 5,447,662; 5,460,907; 5,465,310; 5,466,397; 5,467,421; 5,483,005; 5,484,550; 5,484,821; 5,500,156; 5,501,821; 5,507,974; 5,514,799; 5,514,807; 5,517,350; 5,520,968; 5,521,277; 5,526,450; 5,532,320; 5,534,201; 5,534,613; 5,535,048; 5,536,866; 5,547,705; 5,547,763; 5,557,699; 5,561,733; 5,578,251; 5,588,083; 5,594,075; 5,604,038; 5,604,292; 5,605,726; 5,612,387; 5,622,654; 5,633,337; 5,637,717; 5,649,045; 5,663,308; 5,670,090; 5,670,091; 5,670,603; 5,676,884; 5,679,763; 5,688,906; 5,693,744; 5,707,544; 5,714,304; 5,718,845; 5,726,317; 5,729,641; 5,736,592; 5,738,806; 5,741,442; 5,745,613; 5,746,949; 5,759,447; 5,764,820; 5,770,121; 5,76,374; 5,776,375; 5,777,089; 5,783,306; 5,783,649; 5,800,733; 5,804,101; 5,807,974; 5,811,507; 5,830,988; 5,831,259; 5,834,100; 5,834,575; 5,837,783; 5,844,052; 5,847,032; 5,851,424; 5,851,427; 5,856,384; 5,861,976; 5,862,276; 5,872,882; 5,881,083; 5,882,785; 5,883,259; 5,889,131; 5,892,857; 5,901,259; 5,903,330; 5,908,916; 5,930,017; 5,930,412; 5,935,491; 5,937,115; 5,937,341; 5,940,417; 5,943,154; 5,943,464; 5,948,322; 5,948,915; 5,949,943; 5,953,469; 5,959,159; 5,959,756; 5,962,658; 5,963,683; 5,966,233; 5,970,185; 5,970,186; 5,982,958; 5,982,961; 5,985,084; 5,987,202;

5,993,700; 6,001,958; 6,005,058; 6,005,707; 6,013,748; 6,017,470; 6,020,457; 6,022,671; 6,025,453; 6,026,205; 6,033,773; 6,033,774; 6,037,105; 6,041,157; 6,045,888; 6,047,095; 6,048,928; 6,051,722; 6,061,481; 6,061,487; 6,067,186; 6,072,920; 6,081,632; 6,081,634; 6,081,794; 6,086,794; 6,090,322; and 6,091,879.

The foregoing references provide instruction and guidance to fabricate waveguides from materials generally of the types described herein using approaches such as direct photolithography, reactive ion etching, excimer laser ablation, molding, conventional mask photolithography, ablative laser writing, or embossing (e.g., soft embossing). The foregoing references also disclose electron donors and electron bridges that may be incorporated into the polymers of the invention or that may also incorporate an electron donor and/or electron bridges described herein.

Components of optical communication systems that may be fabricated, in whole or part, with materials according to the present invention include, without limitation, straight waveguides, bends, single-mode splitters, couplers (including directional couplers, MMI couplers, star couplers), routers, filters (including wavelength filters), switches, modulators (optical and electro-optical, e.g., birefringent modulator, the Mach-Zender interferometer, and directional and evanescent coupler), arrays (including long, high-density waveguide arrays), optical interconnects, optochips, single-mode DWDM components, and gratings. The materials described herein may be used with, for example, wafer-level processing, as applied in, for example, vertical cavity surface emitting laser (VCSEL) and CMOS technologies.

In many applications, the materials described herein may be used in lieu of lithium niobate, gallium arsenide, and other inorganic materials that currently find use as light-transmissive materials in optical communication systems.

The materials described herein may be used in telecommunication, data communication, signal processing, information processing, and radar system devices and thus may be used in communication methods relying, at least in part, on the optical transmission of information. Thus, a method according to the present invention may include communicating by transmitting information with light, where the light is transmitted at least in part through a material including a polymer of the invention or related macrostructure.

The materials of the present invention can be incorporated into various electro-optical devices. Accordingly, in another aspect, the invention provides electro-optic devices including the following:

an electro-optical device comprising a polymer or related macrostructure according to the present invention;

a waveguide comprising a polymer or related macrostructure according to the present invention;

an optical switch comprising a polymer or related macrostructure according to the present invention;

an optical modulator comprising a polymer or related macrostructure according to the present invention;

an optical coupler comprising a polymer or related macrostructure according to the present invention;

an optical router comprising a polymer or related macrostructure according to the present invention;

a communications system comprising a polymer or related macrostructure according to the present invention;

a method of data transmission comprising transmitting light through or via a polymer or related macrostructure according to the present invention;

a method of telecommunication comprising transmitting light through or via a polymer or related macrostructure according to the present invention;

a method of transmitting light comprising directing light through or via a polymer or related macrostructure according to the present invention;

a method of routing light through an optical system comprising transmitting light through or via a polymer or related macrostructure according to the present invention;

an interferometric optical modulator or switch, comprising: (1) an input waveguide; (2) an output waveguide; (3) a first leg having a first end and a second end, the first leg being coupled to the input waveguide at the first end and to the output waveguide at the second end; and 4) and a second leg having a first end and a second end, the second leg being coupled to the input waveguide at the first end and to the output waveguide at the second end, wherein at least one of the first and second legs includes a polymer or related macrostructure according to the present invention;

an optical modulator or switch, comprising: (1) an input; (2) an output; (3) a first waveguide extending between the input and output; and (4) a second waveguide aligned to the first waveguide and positioned for evanescent coupling to the first waveguide; wherein at least one of the first and second legs includes a polymer or related macrostructure according to the present invention, the modulator or switch may further including an electrode positioned to produce an electric field across the first or second waveguide; and an optical router comprising a plurality of switches, wherein each switch includes: (1) an input; (2) an output; (3) a first waveguide extending between the input and output; and (4) a second waveguide aligned to the first waveguide and positioned for evanescent coupling to the first waveguide; wherein at least one of the first and second legs includes a polymer or related macrostructure according to the present invention, the plurality of switches may optionally be arranged in an array of rows and columns.

The present invention provides a facile and reversibly thermally crosslinkable nonlinear optical (NLO) polymer system for overcoming the nonlinearity-stability tradeoff in poled polymers. The invention provides high poling efficiency via effective site-isolation in side-chain dendronzied NLO polymers that is maintained after an isolated and mild process of lattice hardening via the Diels-Alder crosslinking reaction. The resulting material exhibits a combination of very large electro-optic coefficient ($r_{33}$ value of 76 pm/V at 1.3 µm) and excellent temporal stability at 70° C.

The following example is provided for the purpose of illustrating, not limiting, the invention.

EXAMPLE

Synthesis and Characterization of a Representative Thermo-Reversibly Crosslinkable NLO Polymer: PSDACLD General methods. Dichloromethane was distilled over phosphorus pentoxide under nitrogen. Tetrahydrofuran (THF) was distilled from sodium benzophenone ketyl under nitrogen prior to use. 4-(Dimethylamino)-pyridinium 4-toluenesulfonate (DPTS) was prepared according to J. S. Moore, S. I. Stupp, *Macromolecules* 23:70, 1990. Compounds 2, 3, and 4 were synthesized by following the similar procedures described in Luo, J. D., et al., *Advanced Materials* 14:1763, 2002, and Yoon, S. S., and W. C. Still, *Tetrahedron* 51:567, 1995All the other chemicals were purchased from Aldrich unless otherwise specified.

PSDACLD Synthesis. The synthesis of PSDACLD is illustrated schematically in FIG. 1.

To a solution of poly(4-vinylphenol) (1, 0.045 g, 0.374 mmol), compound 2 (0.120 g, 0.094 mmol), and DPTS (0.027 g, 0.092 mmol) in the mixture of 7.5 mL of THF and 3 mL of dichloromethane was added 0.024 g of dicyclohexylcarbodiimide (DCC) (0.12 mmol). The reaction mixture was allowed to stir at room temperature for 12 h under nitrogen, and 0.055 g of compound 3 (0.15 mmol) and 0.038 g of DCC (0.18 mmol) were added, and stirred at room temperature for another 12 h. Then, 0.043 g of compound 4 (0.17 mmol) and 0.045 g of DCC (0.22 mmol) were added, and the reaction mixture was stirred at room temperature for 24 h. Iterative dissolving and filtration removed most of the resultant urea. The filtered dichloromethane solution was then added dropwise to stirring methanol. The precipitate was collected and reprecipitation by adding dropwise its dichloromethane solution into methanol afforded polymer PSDACLD as blue-greenish solid (0.170 g, yield 75%). $^1$H NMR (CDCl$_3$, TMS, ppm): δ 7.85-8.3, 7.46 (d), 7.07-7.42 (br m), 7.05 (d, J=8.3 Hz), 6.06-7.26 (br m), 4.82-5.42 (br m), 5.02 (br s), 4.08-4.66 (br m), 3.59-3.92 (br m), 3.08-3.51 (br m), 2.72 (br s), 2.08-2.50 (br m), 0.59-2.10 (br m). $^{19}$F NMR (CDCl$_3$, C$_6$F$_6$, ppm): −135.35 (dd, J=54.9 Hz), −127.7 (dd, J=97.6 Hz), −120.9 (dd, J=61 Hz). UV-Vis spectrum in 1,4-dioxane: λmax=662 nm. $T_g$=100° C.

PSDACLD Thermal Analysis. Thermal analysis was performed by thermal gravimetric analysis (TGA) differential scanning calorimeter (DSC) with the heating rate of 10° C./min under nitrogen. The results were shown in FIG. 3, which is a graph illustrating the thermal analysis PSDACLD. Plots 1 (TGA) and 2 (DSC) correspond to polymer samples that were heated from room temperature to 200° C. In Plot 1, the arrow depicts a 4.5% weight loss corresponding to loss of furan, deprotection of the maleimide to provide the dienophile. In Plot 2, the arrow depicts an endothermic peak corresponding to loss of furan, deprotection of the maleimide to provide the dienophile. Plot 3 (DSC) corresponds to a polymer sample that was heated from room temperature to 200° C. after heating at 125° C. for 30 minutes. In Plot 3, the arrow depicts an endothermic peak corresponding to de-crosslinking (retro-Diels Alder) generating diene and dienophile moieties.

PSDACLD Film Preparation and Electro-Optic (E-O) Measurement. For E-O measurement, the solution of PSDACLD in cyclopentanone (12 wt %, filtered through a 0.2 μm syringe filter) was spin-coated onto the indium tin oxide (ITO) glass substrates. The film was baked under vacuum at 85° C. overnight to ensure the removal of the residual solvent. The $r_{33}$ value was measured using the reflection technique at 1.3 μm as described in Teng, C. C., and H. T. Man, *Appl. Phys. Lett.* 56:1734., 1990.

While the preferred embodiment of the invention has been illustrated and described, it will be appreciated that various changes can be made therein without departing from the spirit and scope of the invention.

What is claimed is:

1. A method for making a crosslinked polymer having electro-optic activity, comprising:
    (a) heating a crosslinkable polymer to form a softened polymer, the crosslinkable polymer having
        (i) one or more polarizable chromophore moieties,
        (ii) one or more diene moieties, and
        (iii) one or more dienophile moieties; wherein the diene and dienophile moieties are reactive to form 4+2 cycloaddition products
    (b) subjecting the softened polymer to an electric field to provide a poled polymer having aligned, polarizable chromophore moieties; and
    (c) cooling the poled polymer to a temperature sufficient to provide a hardened, crosslinked polymer having electro-optic activity.

2. The method of claim 1, wherein cooling the poled polymer to provide a hardened, crosslinked polymer comprises reacting one or more diene moieties with one or more dienophile moieties to form one or more 4+2 cycloaddition moieties.

3. The method of claim 1 further comprising:
    (a) heating the hardened, crosslinked polymer at a temperature sufficient to provide a softened, crosslinkable polymer;
    (b) subjecting the softened, crosslinkable polymer to an electric field to provide a poled crosslinkable polymer; and
    (c) cooling the poled crosslinkable polymer to a temperature sufficient to provide a hardened, crosslinked polymer having electro-optic activity.

4. The method of claim 3, wherein heating the hardened, crosslinked polymer to provide a softened, crosslinkable polymer comprises heating the crosslinked polymer at a temperature sufficient to cause one or more 4+2 cycloaddition moieties to react to form one or more diene moieties and one or more dienophile moieties.

5. The method of claim 1, wherein the crosslinkable polymer is a thermoplastic polymer.

6. The method of claim 1, wherein the crosslinked polymer is a thermoplastic polymer.

7. The method of claim 1, wherein the thermoplastic polymer comprises a dienophile precursor moiety.

8. The method of claim 1, wherein the chromophore moiety comprises one or more crosslinkable moieties.

9. The method of claim 8, wherein the crosslinkable moieties are dendrons.

10. The method of claim 8, wherein the crosslinkable moieties comprise trifluorovinyl ether moieties.

11. The method of claim 8, further comprising crosslinking the crosslinkable moieties.

* * * * *